(12) United States Patent
Saito et al.

(10) Patent No.: US 11,609,488 B2
(45) Date of Patent: Mar. 21, 2023

(54) SCREEN

(71) Applicant: TOPPAN Inc., Tokyo (JP)

(72) Inventors: Kei Saito, Taito-ku (JP); Sohei Abe, Taito-ku (JP); Yuji Yano, Taito-ku (JP); Saori Matsuyama, Taito-ku (JP)

(73) Assignee: TOPPAN Inc., Tokyo (JP)

( * ) Notice: Subject to any disclaimer, the term of this patent is extended or adjusted under 35 U.S.C. 154(b) by 0 days.

(21) Appl. No.: 17/560,742

(22) Filed: Dec. 23, 2021

(65) Prior Publication Data
US 2022/0113617 A1  Apr. 14, 2022

Related U.S. Application Data

(63) Continuation of application No. PCT/JP2020/025262, filed on Jun. 26, 2020.

(30) Foreign Application Priority Data

Jun. 28, 2019  (JP) .............................. JP2019-121810

(51) Int. Cl.
| | |
|---|---|
| G03B 21/62 | (2014.01) |
| G02F 1/1334 | (2006.01) |
| G02F 1/1335 | (2006.01) |
| G02F 1/137 | (2006.01) |

(52) U.S. Cl.
CPC .............. G03B 21/62 (2013.01); G02F 1/137 (2013.01); G02F 1/13345 (2021.01); G02F 1/133509 (2013.01); G02F 1/133555 (2013.01)

(58) Field of Classification Search
CPC ..... G03B 21/62; G03B 21/56; G02F 1/13345; G02F 1/133509; G02F 1/133555; G02F 1/137; G02F 1/13775; G02B 5/0247; G02B 5/0284

See application file for complete search history.

(56) References Cited

U.S. PATENT DOCUMENTS

| | | | |
|---|---|---|---|
| 7,453,635 B2 * | 11/2008 | Yeo | G03B 21/625 359/485.02 |
| 2007/0176887 A1 | 8/2007 | Uehara et al. | |
| 2009/0290078 A1 | 11/2009 | Yang et al. | |
| 2011/0205456 A1 | 8/2011 | Mizoguchi et al. | |

FOREIGN PATENT DOCUMENTS

| | | |
|---|---|---|
| JP | 2006-221070 A | 8/2006 |
| JP | 2016-109953 A | 6/2016 |
| JP | 2017-223950 A | 12/2017 |
| JP | 6489816 B2 | 3/2019 |

OTHER PUBLICATIONS

International Search Report dated Jul. 28, 2020 in PCT/JP2020/025262, filed Jun. 26, 2020, 7 pages (with English Translation).
Extended European Search Report dated Jul. 22, 2022 in European Patent Application No. 20831595.2, 8 pages.

* cited by examiner

*Primary Examiner* — Donald L Raleigh
(74) *Attorney, Agent, or Firm* — Oblon, McClelland, Maier & Neustadt, L.L.P.

(57) ABSTRACT

A screen including a light control sheet which includes a front surface and a rear surface and has a transparent state and an opaque state, and a transparent reflective layer that faces the rear surface. The front surface is positioned such that light from a projection device is applied in the opaque state. The opaque state includes a state in which an average diffuse reflectance of visible light applied to the front surface is 10% or more and less than 20%.

14 Claims, 7 Drawing Sheets

SCREEN

CROSS-REFERENCE TO RELATED APPLICATIONS

The present application is a continuation of International Application No. PCT/JP2020/025262, filed Jun. 26, 2020, which is based upon and claims the benefits of priority to Japanese Application No. 2019-121810, filed Jun. 28, 2019. The entire contents of all of the above applications are incorporated herein by reference.

BACKGROUND OF THE INVENTION

Field of the Invention

The present invention relates to screens including light control sheets.

Discussion of the Background

Screens including light control sheets and transparent reflective layers have an opaque state in which images can be projected thereon and a transparent state in which images cannot be projected thereon. When such a screen is in a transparent state, the observer visually perceives that the two spaces separated by the screen are continuous. Such a screen, when it is in an opaque state, enhances reflectance of light projected to the screen due to the light being reflected at the transparent reflective layer. Thus, screens provide images with luminance enhanced to the observer who is present on the reflection side of the screen to the projected light (ex., see JP 2016-109953 A).

SUMMARY OF THE INVENTION

According to an aspect of the present invention, a screen includes a light control sheet which includes a front surface and a rear surface and has a transparent state and an opaque state, and a transparent reflective layer that faces the rear surface. The front surface is positioned such that light from a projection device is applied in the opaque state, and the opaque state includes a state in which an average diffuse reflectance of visible light applied to the front surface is 10% or more and less than 20%.

According to another aspect of the present invention, a screen includes a light control sheet which includes a front surface and a rear surface and has a transparent state and an opaque state, and a transparent reflective layer that faces the rear surface. The opaque state includes a state in which a diffuse reflectance of light with a wavelength of 430 nm-700 nm applied to the front surface is 10% or more and less than 20%.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1A:
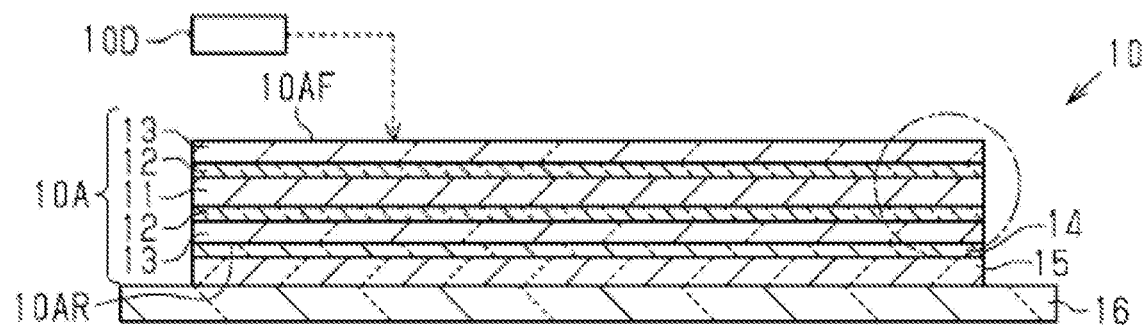
FIG. 1A is a cross-sectional view illustrating a state in which no drive voltage is applied to a light control layer of a screen having a first structure.

The embodiments will now be described with reference to the accompanying drawings, wherein like reference numerals designate corresponding or identical elements throughout the various drawings.

An embodiment of a screen will be described with reference to FIGS. 1A to 9. In the following description, a screen, a method of calculating parameters, and examples, will be sequentially explained. In the present embodiment, light that is not light applied to a screen from a projection device, such as a projector, that projects images is collectively referred to as external light. External light includes solar radiation, illumination light, and the like. Solar radiation may be, for example, radiation from sunlight in the wavelength range of 300 nm or more and 2,500 nm or less. In the present embodiment, objects that are present on the other side of the screen with respect to the observer are collectively referred to as observation targets. Specifically, the screen is present between the observer and an observation target. The target is a target that can be visually inspected via the screen. The observation targets may include, for example, persons, devices and stationary objects.

<Screen>

Referring to FIGS. 1A to 4B, a configuration of a screen will be described. The screen according to the present embodiment has a first structure or a second structure described below.

<First Structure>

Referring to FIGS. 1A-2B, the first structure of the screen will be described.

Figure 1B:
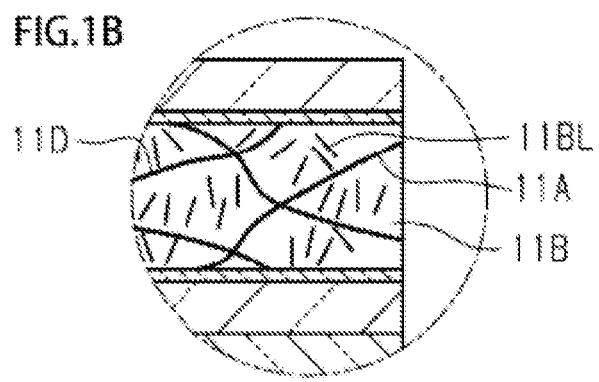
FIG. 1B is an enlarged cross-sectional view illustrating a part of the structure shown in FIG. 1A.
Figure 2A:
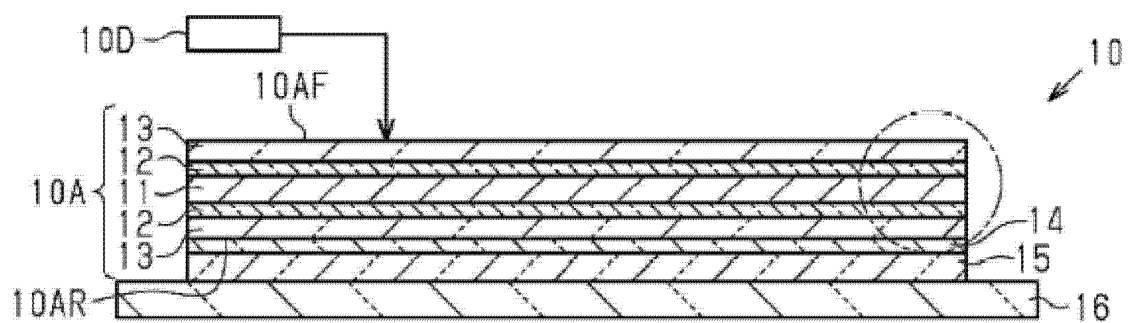
FIG. 2A is a cross-sectional view illustrating a state in which a drive voltage is applied to a light control layer of a screen having the first structure.
Figure 2B:
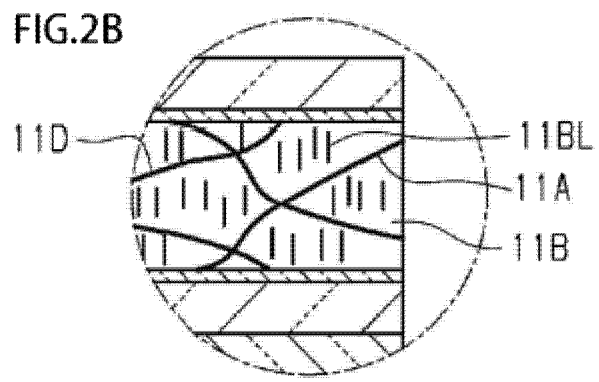
FIG. 2B is an enlarged cross-sectional view illustrating a part of the structure shown in FIG. 2A.

FIGS. 1A and 1B are a set of cross-sectional views illustrating the first structure of the screen in a state in which no drive voltage is applied to a light control layer included in the screen. The drive voltage is a voltage for switching the alignment of liquid crystal molecules contained in the light control layer. FIGS. 2A and 2B are a set of cross-sectional views illustrating the first structure of the screen in a state in which a drive voltage is applied to the light control layer.

FIG. 1A shows a screen 10 including a light control sheet 10A and a transparent reflective layer 15. The light control sheet 10A includes a light control layer 11, two transparent electrode layers 12, and two transparent support layers 13. The two transparent electrode layers 12 sandwich the light control layer 11 in the thickness direction of the light control layer 11. The two transparent support layers 13 sandwich the two transparent electrode layers 12 in the thickness direction of the light control layer 11. The transparent support layers 13 support the two different transparent electrode layers 12. One surface of the light control sheet 10A is a projection surface 10AF as an example of a front surface, and the surface facing away from the projection surface 10AF is a rear surface 10AR.

As shown in FIG. 1B, the light control layer 11 of the present embodiment contains a polymer network 11A and a liquid crystal composition 11B. The polymer network 11A contains a plurality of domains 11D. The domains 11D are voids defined in the polymer network 11A. The domains 11D may be spaces isolated from each other by the polymer network 11A or may be spaces communicating with each other. The liquid crystal composition 11B contains liquid crystal molecules 11BL and is filled in the domains 11D.

The transparent electrode layers 12 are transparent to light in the visible region. Materials for forming the transparent electrode layers 12 may include, for example, transparent electrically conductive oxides (TCO) and electrically conductive polymers. The transparent support layers 13 are transparent to light in the visible region. Materials for forming the transparent support layers 13 may include, for example, glass and synthetic resins.

As shown in FIG. 1A, the screen 10 includes a UV cut layer 14. The UV cut layer 14 contacts the rear surface 10AR of the light control sheet 10A. The UV cut layer 14 is transparent to light in the visible region and minimizes transmission of UV light incident on the UV cut layer 14. The UV cut layer 14 may have a maximum transmittance of 1% or less for light having a wavelength of less than 380 nm. If the screen 10 includes the UV cut layer 14, entry of UV light into the light control layer 11 may be minimized to minimize deterioration of the liquid crystal composition 11B. Specifically, since the UV cut layer 14 does not substantially transmit light with a wavelength of less than 380 nm, deterioration of the liquid crystal composition 11B is more easily minimized.

In the present embodiment, the UV cut layer 14 has adhesion to other layers contacting the UV cut layer 14. The adhesive UV cut layer 14 may contain, for example, a tackifier, and a UV absorber added to the tackifier.

The transparent reflective layer 15 is laminated on the light control sheet 10A via the UV cut layer 14. The transparent reflective layer 15 has reflectivity and transmissivity for light in the visible region, and enhances reflectance of light on the screen 10, compared to the case where the screen 10 includes no transparent reflective layer 15. Materials for forming the transparent reflective layer 15 may be, for example, metal which may be aluminum, nickel, or the like.

The transparent reflective layer 15 may have a solar radiation reflectance of 20% or more and less than 45%. The solar radiation reflectance is calculated according a method based on JIS A 5759:2016. If the solar radiation reflectance of the transparent reflective layer 15 is 20% or more and less than 45%, reflection of an image other than the image projected from a projection device may be minimized, and glare due to reflection of external light on the screen 10 may be minimized. The transparent reflective layer 15 may have a visible light transmittance of 50% or more. The visible light transmittance is calculated according to a method based on JIS A 5759:2016. If the visible light transmittance of the transparent reflective layer 15 is 50% or more, transparency of the screen 10 in a transparent state may be further enhanced.

The screen 10 further includes a transparent substrate 16. The transparent substrate 16 is located on the surface of the transparent reflective layer 15 facing away from the surface that faces the rear surface 10AR of the light control sheet 10A. Materials forming the transparent substrate 16 may be, for example, glass and synthetic resins.

The light control sheet 10A provided to the screen 10 has a transparent state and an opaque state. When the light control sheet 10A is in an opaque state, the screen 10 is also in an opaque state. When the light control sheet 10A is in a transparent state, the screen 10 is also in a transparent state. Specifically, the state of the light control sheet 10A determines whether the screen 10 is in a transparent state or in an opaque state. In the screen 10, the state in which an image is projected thereto by projected light is an opaque state, and the state in which no image is projected thereto by projected light is a transparent state. Specifically, the transparent state is a state in which no image is formed on the screen 10 when the light is projected to the screen. In the light control layer 11, the alignment of the liquid crystal molecules 11BL is changed in response to application or non-application of a drive voltage that drives the liquid crystal molecules 11BL, so that the state of the light control sheet 10A is switched between a transparent state and an opaque state. The projection surface 10AF is a surface to which light from the projection device is applied in an opaque state.

In the present embodiment, the opaque state includes a state in which no drive voltage is applied. As mentioned above, in the screen 10 shown in FIGS. 1A and 1B, no drive voltage is applied to the two transparent electrode layers 12. In this case, the liquid crystal molecules 11BL in the domains 11D are randomly oriented. Accordingly, the light that is incident on either of the two transparent support layers 13 and enters the screen 10 is isotropically scattered in the light control layer 11. Accordingly, the screen 10 is in an opaque state. When no drive voltage is applied to the light control layer 11, the screen 10 is brought into a most opaque state.

The opaque state of the screen 10 includes a state in which an average of diffuse reflectances (termed average diffuse reflectance hereinafter) to light in the visible region is 10% or more and less than 20% on the projection surface 10AF. The visible region is based on JIS Z 8120:2001, and an arbitrary wavelength in the range of 360 nm or more and 400 nm or less is defined to be a lower limit, and an arbitrary wavelength in the range of 760 nm or more and 830 nm or less is defined to be an upper limit. In the present embodiment, the visible region is more specifically defined to be a wavelength range of 380 nm or more and 780 nm or less.

The average diffuse reflectance may be, for example, an average of diffuse reflectances detected for every 1 nm in the wavelength range of 380 nm to 780 nm. If the average diffuse reflectance of the screen 10 is 10% or more, sharpness is maintained in the image projected to the screen 10, and if it is less than 20%, glare from the screen 10, which is due to reflection of external light on the screen 10, can be minimized.

The opaque state of the screen 10 of the present embodiment includes a state in which each diffuse reflectance to light having any wavelength in the range of 430 nm or more and 700 nm or less is 10% or more and less than 20%. Specifically, the opaque state includes a state in which each diffuse reflectance of the screen 10 is 10% or more and less than 20% for light having an arbitrary wavelength of 430 nm or more and 700 nm or less. The wavelength range of 430 nm or more and 700 nm or less is a range that includes a maximum value of luminous efficiency. The luminous efficiency refers to an index expressing the intensity with which the human eye perceives the luminance of light for each wavelength. The luminous efficiency is maximized at a wavelength of 555 nm. For reference sake, according to the standard luminous efficiency for photopic vision defined by the International Commission on Illumination (CIE), luminous efficiency is higher with light in the wavelength range of 400 nm or more and 700 nm or less compared to other wavelength ranges.

Accordingly, if each diffuse reflectance to light having a wavelength of 430 nm or more and 700 nm or less (also simply termed diffuse reflectance hereinafter) is 10% or more and less than 20%, the observer of the screen 10 can be suitably prevented from feeling dazzled due to glare which is cause by reflection of external light on the screen 10. Thus, visibility of the screen 10 can be enhanced.

In the screen 10, either the average diffuse reflectance or each diffuse reflectance may be in the above range, or both of the average diffuse reflectance and each diffuse reflectance may be in the above range of each parameter.

The opaque state of the screen 10 may further include a state in which haze of the screen 10 is 98% or more and clarity of the screen 10 is 42% or less. Haze is calculated using a method according to JIS K 7136:2000. Thus, sharpness of the image projected to the screen 10 is further enhanced.

As shown in FIGS. 2A and 2B, when a drive voltage is applied to the light control layer 11 by a drive circuit 10D, the alignment of the liquid crystal molecules 11BL that was previously random is changed to an alignment allowing transmission of light therethrough. The alignment allowing transmission of light may be, for example, vertical alignment. The liquid crystal molecules 11BL are positioned in the domains 11D so that the long axes of the liquid crystal molecules 11BL are substantially perpendicular to the plane in which the light control layer 11 is provided. Accordingly, the light that is incident on the projection surface 10AF and enters the light control layer 11 passes through the light control layer 11 without substantially being scattered therein. Therefore, the light control layer 11 is in a transparent state and thus the screen 10 is also in a transparent state.

The transparent state of the screen 10 may further include a state in which haze of the screen 10 is 12.8% or less and parallel light transmittance of the screen 10 is 42% or more. Thus, the transparency of the screen 10 when it is in a transparent state can be enhanced.

<Second Structure>

Referring to FIGS. 3A-4B, the second structure of the screen will be described.

Figure 3A:
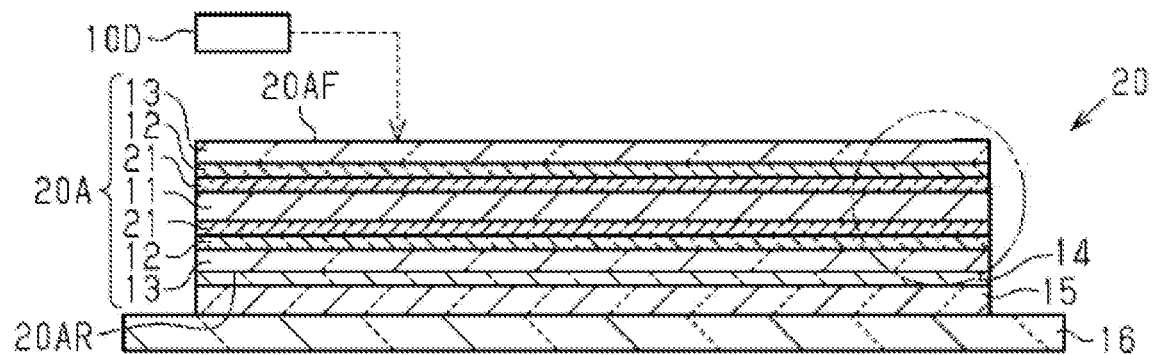
FIG. 3A is a cross-sectional view illustrating a state in which no drive voltage is applied to a light control layer of a screen having a second structure.
Figure 3B:
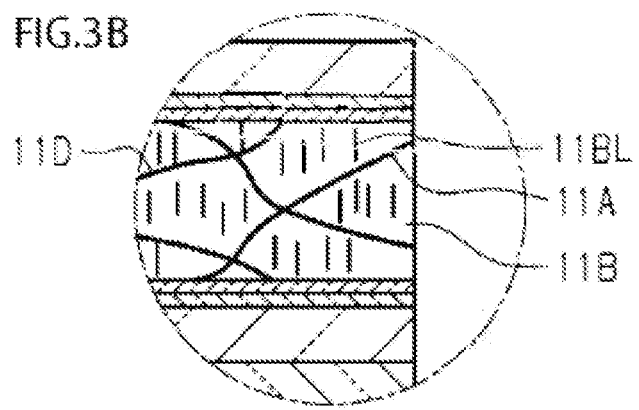
FIG. 3B is an enlarged cross-sectional view illustrating a part of the structure shown in FIG. 3A.
Figure 4A:
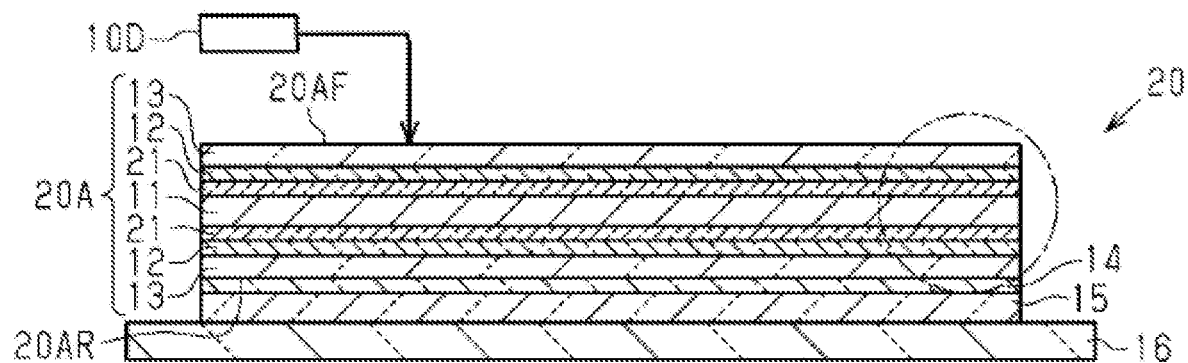
FIG. 4A is a cross-sectional view illustrating a state in which a drive voltage is applied to a light control layer of a screen having the second structure.
Figure 4B:
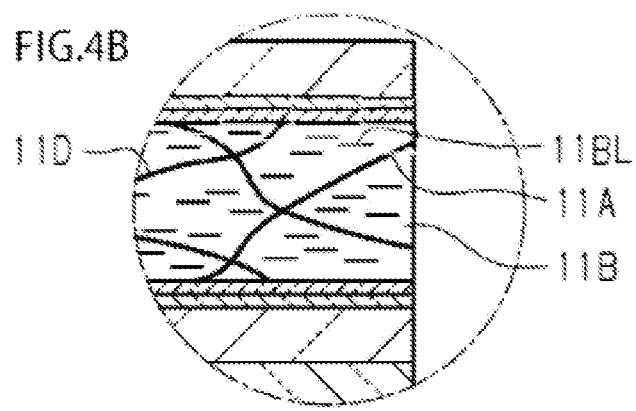
FIG. 4B is an enlarged cross-sectional view illustrating a part of the structure shown in FIG. 4A.

FIGS. 3A and 3B are a set of cross-sectional views illustrating a state in which no drive voltage is applied to a light control layer 11 in the second structure of the screen. FIGS. 4A and 4B are a set of cross-sectional views illustrating a state in which a drive voltage is applied to the light control layer 11 in the second structure of the screen.

FIG. 3A shows a screen 20 including a light control sheet 20A. In addition to a light control layer 11, two transparent electrodes 12, and two transparent support layers 13, the light control sheet 20A includes two alignment layers 21 sandwiching the light control layer 11. The two alignment layers 21 sandwich the light control layer 11 in the thickness direction of the light control layer 11. The two transparent electrode layers 12 sandwich the two alignment layers 21 in the thickness direction of the light control layer 11. Of the two surfaces of the light control sheet 20A facing each other, one surface is a projection surface 20AF as an example of a front surface, and the other surface is a rear surface 20AR.

If the alignment layers 21 are vertical alignment layers, the liquid crystal molecules 11BL in the domains 11D are vertically aligned in the state in which no drive voltage is applied to the light control layer 11. The liquid crystal molecules 11BL are positioned in the domains 11D so that the long axes of the liquid crystal molecules 11BL are substantially perpendicular to the plane in which the light control layer 11 is provided. Accordingly, the light that is incident on the projection surface 20AF and enters the screen 20 passes through the light control layer 11 without substantially being scattered therein. Therefore, the light control layer 11 is in a transparent state and thus the screen 20 is also in a transparent state.

The transparent state of the screen 20 may further include a state in which, as in the first structure described above, haze of the screen 20 is 12.8% or less and parallel light transmittance of the screen 20 is 42% or more. Thus, the transparency of the screen 20 when it is in a transparent state can be enhanced.

As shown in FIG. 4B, while a drive voltage is applied to the light control layer 11, the alignment of the liquid crystal molecules 11BL changes. For example, the alignment of the liquid crystal molecules 11BL changes from a vertical alignment to a horizontal alignment. In this case, the liquid crystal molecules 11BL are positioned in the domains 11D so that the long axes of the liquid crystal molecules 11BL are extended parallel to the plane in which the light control layer 11 is provided. Accordingly, the light that is incident on the projection surface 20AF and enters the screen 20 is scattered in the light control layer 11. Accordingly, the screen 20 is also in an opaque state.

As in the first structure described above, the opaque state of the screen 20 may further include a state in which the average diffuse reflectance of the screen 20 is 10% or more and less than 20%. Also, the opaque state of the screen 20 includes a state in which each diffuse reflectance is 10% or more and less than 20%. In other words, when the screen 20 is in an opaque state, the two transparent electrode layers 12 have a drive voltage applied thereto by the drive circuit 10D to achieve an average diffuse reflectance and/or each diffuse reflectance of 10% or more and less than 20% on the screen 20. In the screen 20 as well, only the average diffuse reflectance or each diffuse reflectance may be in the preferred wavelength range mentioned above, or both of the average diffuse reflectance and each diffuse reflectance may be in the above preferred range of each parameter.

As in the first structure, the opaque state of the screen 20 may include a state in which haze of the screen 20 is 98% or more and clarity of the screen 20 is 42% or less. Thus, sharpness of the image projected to the screen 20 is further enhanced.

As mentioned above, the screens 10 and 20 can both be used as reflective screens. In a reflective screen, light is projected to the screen 10 or 20 from the opposite side of the light control sheet 10A or 20A to that facing the transparent reflective layer 15, and the observer visually perceives the light reflected from the screen 10 or 20. However, these screens 10 and 20 can also be used as transmissive screens. In a transmissive screen, light is projected to the screen 10 or 20 from the opposite side of the light control sheet 10A or 20A to that facing the transparent reflective layer 15, and the observer visually perceives the light that has passed through the screen 10 or 20.

<Method of Calculating Diffuse Reflectance>

Figure 5A:
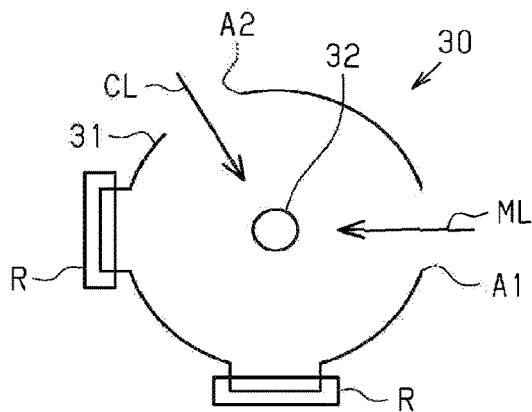
FIG. 5A is a schematic diagram illustrating a configuration of a diffuse reflectance measurement device, together with standard white plates as measurement targets.
Figure 5B:
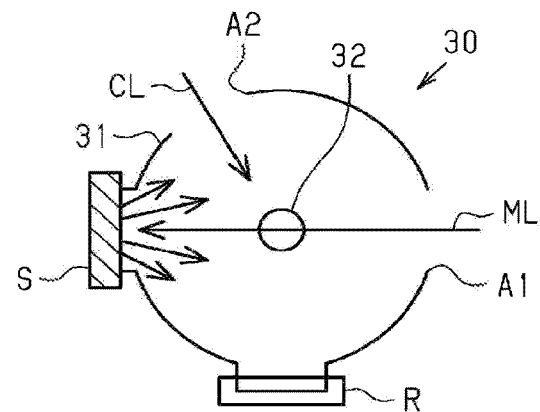
FIG. 5B is a schematic diagram illustrating a configuration of a diffuse reflectance measurement device, together with a screen as a measurement target.

Referring to FIGS. 5A and 5B, a method of calculating a diffuse reflectance will be described. FIGS. 5A and 5B are a set of diagrams each illustrating a measurement device used for calculating a diffuse reflectance. FIG. 5A is a schematic diagram illustrating a measurement method used for correcting a diffuse reflectance baseline. FIG. 5B is a schematic diagram illustrating a measurement method used when measuring a diffuse reflectance of a measurement target. FIGS. 5A and 5B schematically illustrate a structure of a measurement device in plan view together with standard white plates or measurement targets.

As shown in FIG. 5A, when measuring a diffuse reflectance of a screen, a diffuse reflectance baseline is corrected. The baseline is corrected based on the results of measurements obtained when measurement light is applied to standard white plates R mounted to an integrating sphere.

A diffuse reflectance measurement device 30 may include, for example, an integrating sphere 31 and a detection part 32. The integrating sphere 31 is a sphere that has an inner wall made of a material, such as barium sulfate, having high reflectivity. The integrating sphere 31 includes a first opening A1 and a second opening A2. The integrating sphere 31 scatters light that is incident from the openings A1 and A2 formed in the integrating sphere 31. In the present embodiment, only diffuse reflected light containing no specular reflected light is measured for use in the calculation of a diffuse reflectance described above. The standard white plates R are mounted to the integrating sphere 31 at positions respectively facing the first and second openings A1 and A2. The standard white plates R have reflection surfaces made, for example, of barium sulfate.

In the integrating sphere 31, measurement light ML is incident from the first opening A1, while contrast light CL is incident from the second opening A2. The measurement light ML and the contrast light CL are obtained as a result of dividing light emitted from one light source into two light beams of a short wavelength using a spectroscope. Thus, one light beam serves as the measurement light ML and the other light beam serves as the contrast light CL. The measurement light ML and the contrast light CL that are incident from the openings A1 and A2 propagate straight in the integrating sphere 31 toward the standard white plates R.

The detection part 32 detects light that is reflected from the standard white plates R and then diffused in the integrating sphere 31. The detection part 32 is installed at a position where the measurement light ML and the contrast light CL are not directly applied. Since the incidence angle of the measurement light ML for the standard white plate R is 0°, the specular reflected light of the measurement light ML leaves the integrating sphere 31 from the first opening A4 from which the measurement light ML is incident. Thus, the detection part 32 detects only diffuse reflected light that is diffused in the integrating sphere 31, in the light reflected from the standard white plate R.

On the other hand, the incidence angle of the contrast light CL that is incident from the second opening A2 and has entered the integrating sphere 31 is about 8°. Therefore, the specular reflected light and the diffuse reflected light of the contrast light CL are diffused in the integrating sphere 31. Thus, the detection part 32 detects both the specular reflected light and the diffuse reflected light of the contrast light. The detection part 32 simultaneously detects the contrast light and the measurement light, and the intensity of the light detected in this case is used as a baseline.

As shown in FIG. 5B, when measuring a diffuse reflectance of a measurement target, a measurement target S is mounted to the measurement device 30 replacing the standard white plate R mounted at a position facing the first opening A1. In the present embodiment, the measurement target S is the screen 10 or 20. The size of the screen 10 or 20 is adjusted to a specified size when performing measurements.

During measurement of a diffuse reflectance of the measurement target S, the measurement light ML incident on the measurement target S is reflected from the measurement target S, while the contrast light CL incident on the standard white plate R is reflected from the standard white plate R. As in the baseline correction, the specular reflected light based on the measurement light MIL leaves the integrating sphere 31 from the first opening A1. Therefore, the detection part 32 detects only the diffuse reflected light diffused in the integrating sphere 31, in the light reflected from the measurement target S.

On the other hand, the specular reflected light and the diffuse reflected light based on the contrast light CL that is incident from the second opening A2 and has entered the integrating sphere 31 are diffused in the integrating sphere 31. Therefore, the detection part 32 detects both the specular reflected light and the diffuse reflected light of the contrast light CL. Thus, a diffuse reflectance is calculated as a percentage of light intensity obtained using the measurement target S to light intensity obtained in baseline correction. In this way, each diffuse reflectance of the screen 10 or 20 can be obtained for the wavelength in the range of 430 nm or more and 700 nm or less. Furthermore, an average diffuse reflectance of the screen 10 or 20 can be obtained by averaging the diffuse reflectances to light in the wavelength range of 380 nm or more and 780 nm or less. It should be noted that, when calculating an average diffuse reflectance, the present embodiment uses a diffuse reflectance obtained every 1 nm in the wavelength range of 380 nm or more and 780 nm or less.

<Method of Calculating Clarity>

Figure 6:
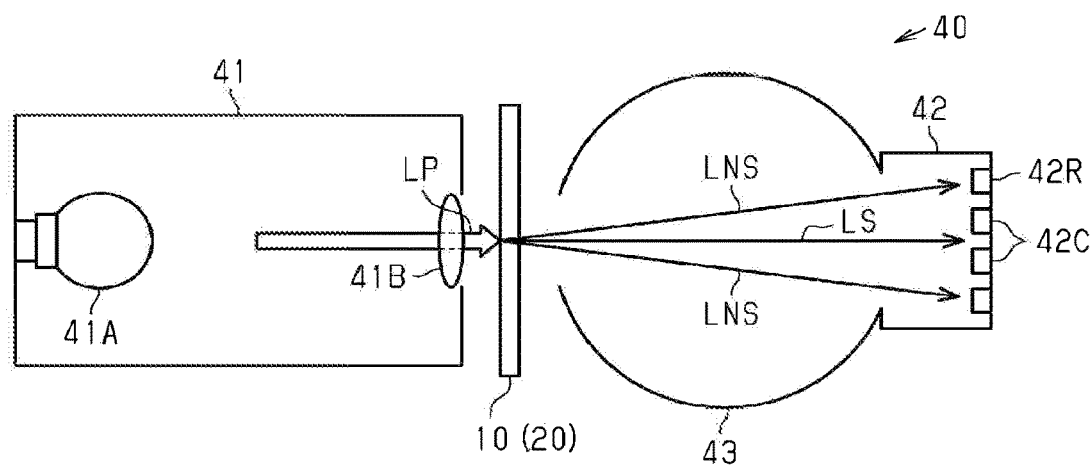
FIG. 6 is a schematic diagram illustrating a configuration of a clarity measurement device, together with a screen as a measurement target.

Referring to FIG. 6, a method of calculating a clarity will be described. FIG. 6 is a schematic diagram illustrating an example of a measurement device used for calculating a clarity.

FIG. 6 shows a clarity measurement device 40, which includes an illumination part 41, a light-receiving part 42, and an integrating sphere 43. The illumination part 41 includes a light source 41A and a lens 41B. The light source 41A is a white LED, and the lens 41B converts the light emitted from the light source 41A into parallel light LP. The light-receiving part 42 includes a center sensor 42C and an outer peripheral sensor 42R. The center sensor 42C and the outer peripheral sensor 42R are annularly shaped. The outer peripheral sensor 42R is located on the outside of the center sensor 42C. The measurement device 40 can be used for measuring not only clarity but also haze of a measurement target. The integrating sphere 43 of the measurement device 40 is used only when measuring haze.

In the measurement device 40, the screen 10 or 20 is placed between the illumination part 41 and the integrating sphere 43. The flux of parallel light LP emitted from the lens 41B has a diameter of 14 mm in the present embodiment. The light that has passed through the screen includes straight light LS propagating straight along the optical axis of the parallel light LP that has entered the screen, and narrow-angle scattered light LNS having an angle of ±2.5° or narrower relative to the optical axis of the parallel light LP. In the light-receiving part 42, the center sensor 42C receives the straight light LS, and the outer peripheral sensor 42R receives the narrow-angle scattered light LNS. The intensity of the straight light LS received by the center sensor 42C is defined to be $I_C$, and the intensity of the narrow-angle scattered light LNS received by the outer peripheral sensor 42R is defined to be $I_R$.

Clarity is calculated from the following Formula (1), where $I_C$ is the intensity of the straight light LS propagating straight along the optical axis of the parallel light LP that is incident on the screen 10 or 20, and $I_R$ is the intensity of the narrow-angle scattered light LNS having an angle of ±2.5° or narrower relative to the optical axis of the parallel light LP, in the light that has passed through the screen 10 or 20

$$100 \times (I_C - I_R)/(I_C + I_R) \quad \text{Formula (1)}$$

Thus, clarity is a parameter for evaluating the state of the screen 10 or 20 by using narrow-angle scattered light. Therefore, clarity can be used for evaluating the degree of sharpness of very small portions of an observation target in an image of the observation target via the screen 10 or 20. Thus, when the observer visually inspects an observation target via the screen 10 or 20, the contours of the observation target, in other words, the sharpness of the observation target, will be blurred more as the value of clarity of the screen 10 or 20 decreases. Thus, clarity is used for evaluating sharpness in an image of an observation target visually inspected via the screen 10 or 20.

<Method of Calculating Haze>

Haze of the screen 10 or 20 can be calculated based on the intensity measured using the measurement device 40. It should be noted that haze is calculated using a method according to JIS K 7136:2000. When measuring haze using the measurement device 40, the light that has passed through the screen 10 or 20 is received by the light-receiving part disposed in the integrating sphere 43.

The term haze refers to a percentage of transmitted light deviated from the incident light by 2.5° or more due to forward scattering, in the light that has passed through the screen 10 or 20. In other words, in haze measurements, parallel light refers to light at an angle of less than ±2.5° relative to the optical axis of the parallel light LP, and wide-angle scattered light refers to light at an angle of ±2.5° or more. The transmittance of the wide-angle scattered light is defined to be a diffuse transmittance $T_d$, the transmittance of the parallel light is defined to be a parallel transmittance $T_p$, and a sum of the parallel transmittance $T_p$ and the diffuse transmittance $T_d$ is defined to be a total light transmittance $T_t$. In this case, haze is the ratio of the diffuse transmittance $T_d$ to the total light transmittance $T_t$.

Thus, haze is a parameter for evaluating the state of the screen 10 or 20 using the wide-angle scattered light. Therefore, haze can be used for evaluating the degree of turbidity of the screen 10 or 20 as a whole, e.g., the degree of whiteness of the screen 10 or 20 as a whole, perceived by the observer visually inspecting the screen 10 or 20. Thus, when the observer visually inspects an observation target via the screen 10 or 20, the contrast between the observation target and the surrounding thereof will be lowered as the value of haze of the screen 10 or 20 increases and thus the observation target may appear to be blurred to the observer.

<Method of Calculating Parallel Light Transmittance>

As explained in the calculation method for haze, the parallel light transmittance $T_p$ refers to a percentage of transmitted light deviated by only less than 2.5° relative to the incident light due to forward scattering.

<Method of Calculating Solar Radiation Transmittance and Solar Radiation Reflectance>

Solar radiation transmittance and solar radiation reflectance are measured using a method according to JIS A 5759:2016 mentioned above. A solar radiation transmittance $\tau_e$ is a ratio of a transmitted radiant flux to an incident radiant flux, in terms of a radiant flux of solar radiation that is perpendicularly incident on a screen. A solar radiation reflectance $\rho_e$ is a ratio of a reflected radiant flux to an incident radiant flux, in terms of a radiant flux of solar radiation that is perpendicularly incident on a screen.

The transmitted radiant flux is calculated by measuring spectral transmittances $\tau(\lambda)$ of solar radiation in the wavelength range of 300 nm or more and 2,500 nm or less, multiplying each of the measured spectral transmittances $\tau(\lambda)$ by a weighting factor $E_\lambda \cdot \Delta\lambda$, and weight-averaging the products. The solar radiation transmittance $\tau_e$ is expressed by the following Formula (2).

< Math. 1 >

$$\tau_e = \frac{\sum_{300}^{2500} \tau(\lambda) E_\lambda \Delta\lambda}{\sum_{300}^{2500} E_\lambda \Delta\lambda} \quad \text{Formula (2)}$$

The reflected radiant flux is calculated by measuring spectral reflectances $\rho(\lambda)$ of solar radiation in the wavelength range of 300 nm or more and 2,500 nm or less, multiplying each of the measured spectral reflectances $\rho(\lambda)$ by a weighting factor $E_\lambda \cdot \Delta\lambda$, and weight-averaging the products. The solar radiation reflectance $\rho_e$ is expressed by the following Formula (3).

< Math. 2 >

$$\rho_e = \frac{\sum_{300}^{2500} \rho(\lambda) E_\lambda \Delta\lambda}{\sum_{300}^{2500} E_\lambda \Delta\lambda} \quad \text{Formula (3)}$$

The spectral transmittances $\tau(\lambda)$ are obtained through transmission measurements using an integrating sphere with an ultraviolet visible near-infrared spectrometer, in terms of solar radiation in the wavelength range of 300 nm or more and 2,500 nm or less. The spectral reflectances $\rho(\lambda)$ are obtained through reflection measurements using an integrating sphere with an ultraviolet visible near-infrared spectrometer, in terms of solar radiation in the wavelength range of 300 nm or more and 2,500 nm or less. The weighting factor $E_\lambda \cdot \Delta\lambda$ indicates a standard spectral distribution of solar radiation and is based on JIS A 5759:2016.

<Method of Calculating Visible Light Transmittance and Visible Light Reflectance>

The visible light transmittance is measured according to a method based on JIS A 5759:2016. The visible light reflectance is measured according a method based on JIS R 3106:2019. A visible light transmittance $\tau_v$ is a ratio of a transmitted luminous flux to an incident luminous flux, in terms of a luminous flux of visible light that is perpendicularly incident on a screen. A visible light reflectance $\rho_v$ is a ratio of a transmitted luminous flux to an incident luminous flux, in terms of a luminous flux of visible light that is perpendicularly incident on a screen.

The transmitted luminous flux is calculated by measuring spectral transmittances $\tau(\lambda)$ of light in the wavelength range of 380 nm or more and 780 nm or less, multiplying each of the measured spectral transmittances $\tau(\lambda)$ by a weighting factor $D_\lambda \cdot V(\lambda) \Delta\lambda$, and weight-averaging the products. The visible light transmittance $\tau_v$ is expressed by the following Formula (4).

< Math. 3 >

$$\tau_V = \frac{\sum_{300}^{780} \tau(\lambda) D_\lambda V(\lambda) \Delta \lambda}{\sum_{300}^{780} D_\lambda V(\lambda) \Delta \lambda} \quad \text{Formula (4)}$$

The spectral transmittances $\tau(\lambda)$ are obtained through transmission measurements using an integrating sphere with an ultraviolet visible near-infrared spectrometer, in terms of visible light in the wavelength range of 380 nm or more and 780 nm or less. The weighting factor $D_\lambda \cdot V(\lambda) \Delta\lambda$ is a value based on JIS A 5759:2016.

The reflected luminous flux is calculated by measuring spectral reflectances $\rho(\lambda)$ of light in the wavelength range of 380 nm or more and 780 nm or less, multiplying each of the measured spectral reflectances $\rho(\lambda)$ by a weighting factor $D_\lambda \cdot V_\lambda$, and weight-averaging the products. The visible light reflectance $\rho_v$ is expressed by the following Formula (5).

< Math. 4 >

$$\rho_V = \frac{\sum_\lambda D_\lambda \cdot V_\lambda \cdot \rho(\lambda)}{\sum_\lambda D_\lambda \cdot V_\lambda} \quad \text{Formula (5)}$$

The spectral reflectances $\rho(\lambda)$ are obtained through reflection measurements using an integrating sphere with an ultraviolet visible near-infrared spectrometer, in terms of visible light in the wavelength range of 380 nm or more and 780 nm or less. The weighting factor $D_\lambda \cdot V_\lambda$ is a value based on JIS A 3106:2019.

EXAMPLES

Figure 7:
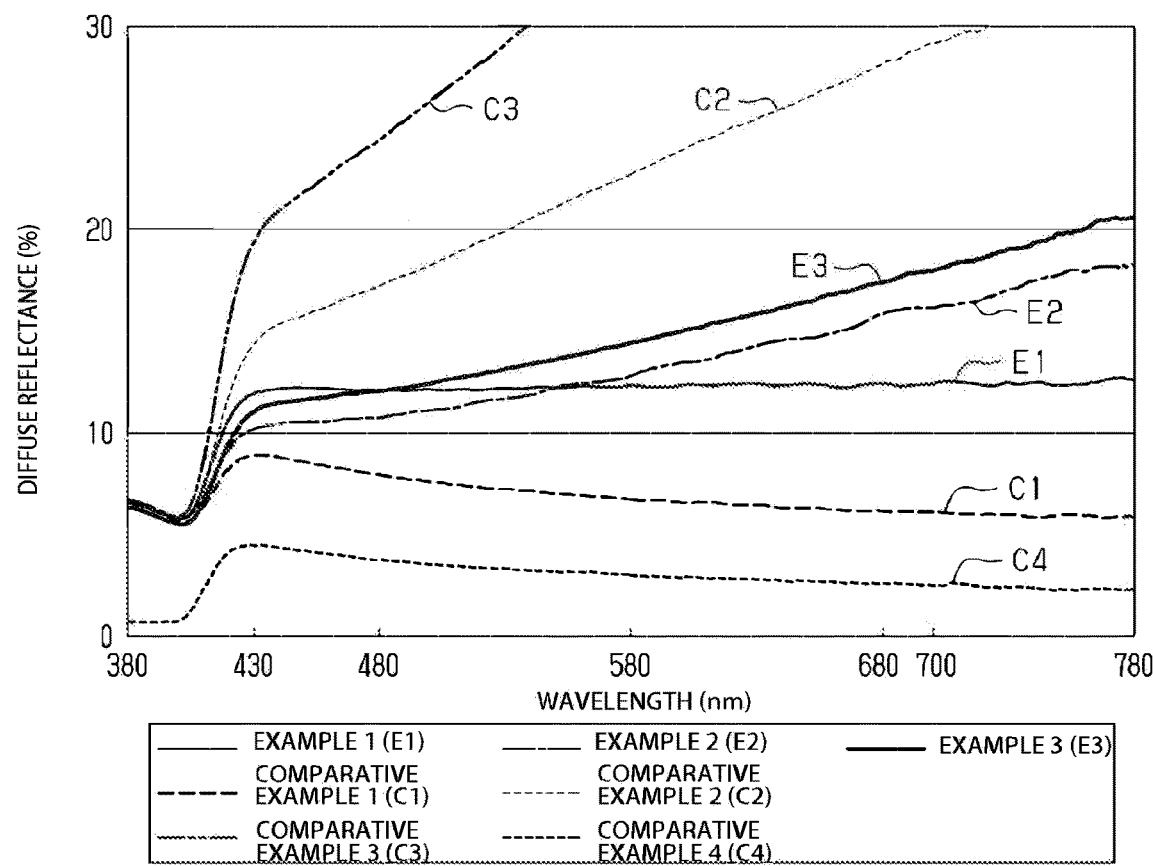
FIG. 7 is a graph illustrating diffuse reflectances of screens according to examples and test examples.
Figure 8:
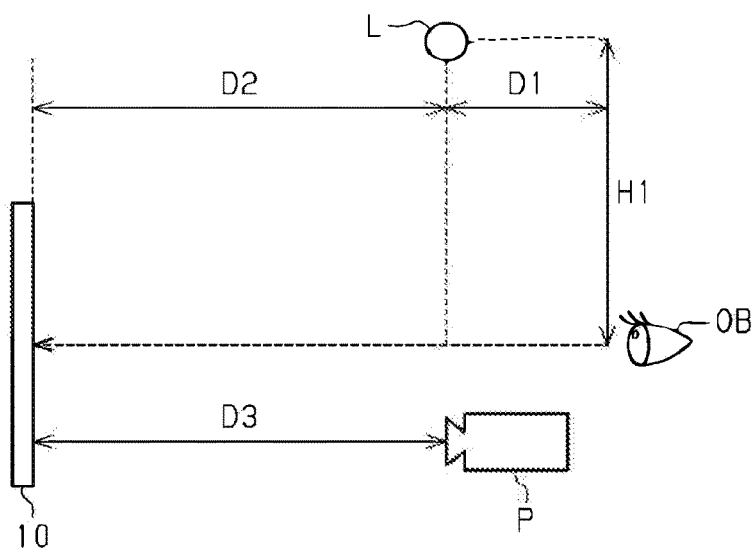
FIG. 8 is a schematic diagram illustrating an evaluation method when evaluating image sharpness, anti-reflective properties and anti-glare properties of screens in an opaque state.
Figure 9:
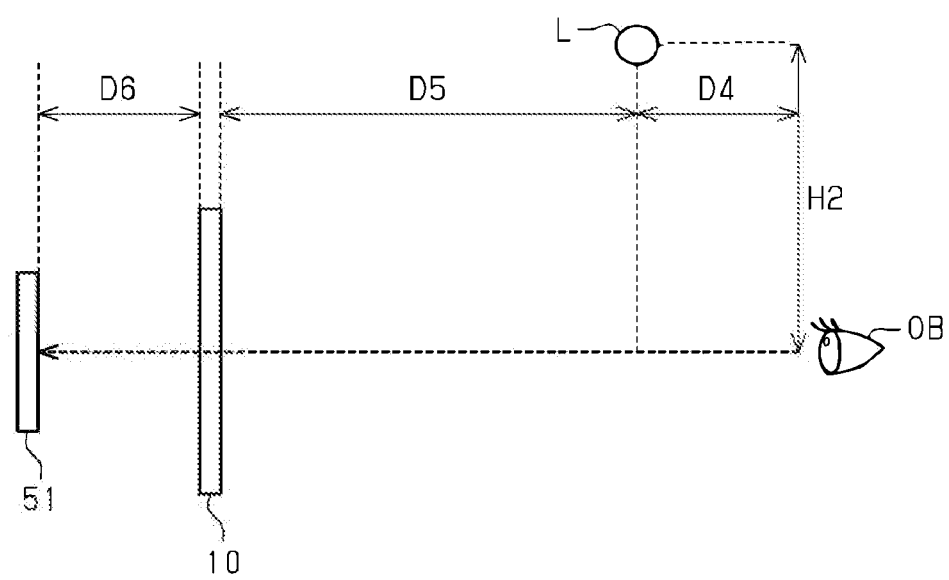
FIG. 9 is a schematic diagram illustrating an evaluation method when evaluating transparency, anti-reflective properties and anti-glare properties of screens in a transparent state.

With reference to FIGS. 7 to 9, some examples will be described.

Example 1

A screen of Example 1 was obtained by sequentially laminating a light control sheet having a polymer network light control layer, a UV cut layer, a transparent reflective layer (SP-MSV50 manufactured by Braintec Inc.), and a transparent substrate. It should be noted that a screen having the first structure described above was obtained as a screen of Example 1. Through measurements using a spectrometer (U-4100, manufactured by Hitachi High-Tech Corporation), the transparent reflective layer was found to have a visible light transmittance of 50% and a visible light reflectance of 25%. Also, through measurements using a spectrometer (the same as above), the transparent reflective layer was found to have a solar radiation reflectance of 24%, a solar radiation transmittance of 40%, and a solar radiation absorptance of 36%.

Comparative Example 1

A screen of Comparative Example 1 was obtained as in Example 1 except that the transparent reflective layer was replaced by SP-MSV70 (manufactured by Braintec Inc.). Through measurements using a spectrometer (the same as above), the transparent reflective layer was found to have a visible light transmittance of 68% and a visible light reflectance of 12%. Also, through measurements using a spectrometer (the same as above), the transparent reflective layer was found to have a solar radiation reflectance of 13%, a solar radiation transmittance of 56%, and a solar radiation absorptance of 31%.

Example 2

A screen of Example 2 was obtained as in Example 1 except that the transparent reflective layer was replaced by RE50NIAR (manufactured by 3M Japan Limited). Through measurements using a spectrometer (the same as above), the transparent reflective layer was found to have a visible light transmittance of 51% and a visible light reflectance of 26%. Also, through measurements using a spectrometer (the same as above), the transparent reflective layer was found to have a solar radiation reflectance of 32%, a solar radiation transmittance of 38%, and a solar radiation absorptance of 30%.

Example 3

A screen of Example 3 was obtained as in Example 1 except that the transparent reflective layer was replaced by Nova70 (manufactured by LINTEC Corporation). Through measurements using a spectrometer (the same as above), the transparent reflective layer was found to have a visible light transmittance of 64% and a visible light reflectance of 26%. Also, through measurements using a spectrometer (the same as above), the transparent reflective layer was found to have a solar radiation reflectance of 34%, a solar radiation transmittance of 46%, and a solar radiation absorptance of 20%.

Comparative Example 2

A screen of Comparative Example 2 was obtained as in Example 1 except that the transparent reflective layer was replaced by Nova50 (manufactured by LINTEC Corporation). Through measurements using a spectrometer (the same as above), the transparent reflective layer was found to have a visible light transmittance of 49% and a visible light reflectance of 37%. Also, through measurements using a spectrometer (the same as above), the transparent reflective layer was found to have a solar radiation reflectance of 45%, a solar radiation transmittance of 32%, and a solar radiation absorptance of 23%.

Comparative Example 3

A screen of Comparative Example 3 was obtained as in Example 1 except that the transparent reflective layer was replaced by Nova35 (manufactured by LINTEC Corporation). Through measurements using a spectrometer (the same as above), the transparent reflective layer was found to have a visible light transmittance of 38% and a visible light reflectance of 46%. Also, through measurements using a spectrometer (the same as above), the transparent reflective layer was found to have a solar radiation reflectance of 52%, a solar radiation transmittance of 24%, and a solar radiation absorptance of 24%.

Comparative Example 4

A screen of Comparative Example 4 was obtained as in Example 1 except that the screen included no transparent reflective layer.

<Optical Characteristics of Screen in Opaque State>

Diffuse reflectance, haze and clarity were calculated for each of the screens of Examples 1 to 3 and Comparative Examples 1 to 4 in an opaque state. Each diffuse reflectance was measured using UV-3600 (manufactured by Shimadzu Corporation). Haze was measured using a hazemeter (NDH7000SP manufactured by Nippon Denshoku Industries Co., Ltd.). Clarity was measured using a haze/transparency measurement device (haze-gard i manufactured by BYK-Gardner GmbH). Since the screens of the examples and the comparative examples each had the first structure described above, the parameters were calculated in a state in which no drive voltage was applied to the screens.

<Evaluations>

Diffuse reflectances calculated for the screens of the examples and the comparative examples were as shown in FIG. 7.

As shown in FIG. 7, in the screens of Examples 1 to 3, all light having a wavelength of 430 nm to 700 nm had a diffuse reflectance of 10% or more and less than 20%. On the other hand, in the screens of Comparative Examples 1 and 4, light having a wavelength of 430 nm or more and 700 nm or less had a diffuse reflectance of less than 10%. In the screen of Comparative Example 2, light having a wavelength of 415 nm or less had a diffuse reflectance of less than 10% and light having a wavelength of 532 nm or more had a diffuse reflectance of 20% or more. In the screen of Comparative Example 3, light having a wavelength of 411 nm or less had a diffuse reflectance of less than 10% and light having a wavelength of 433 nm or more had a diffuse reflectance 20% or more.

Average diffuse reflectance, haze and clarity calculated for the screens of the examples and the comparative examples were as shown in Table 1.

TABLE 1

|  | Ex. 1 | Comp. Ex. 1 | Ex. 2 | Ex. 3 | Comp. Ex. 2 | Comp. Ex. 3 | Comp. Ex. 4 |
| --- | --- | --- | --- | --- | --- | --- | --- |
| Average diffuse reflectance (%) | 11.8 | 6.8 | 13.0 | 14.4 | 22.0 | 31.1 | 2.9 |
| Haze (%) | 98.7 | 98.7 | 98.7 | 98.0 | 98.8 | 98.8 | 98.9 |
| Clarity (%) | 37.3 | 41.9 | 38.9 | 37.6 | 40.3 | 34.2 | 40.0 |

As shown in Table 1, the average diffuse reflectance of Example 1 was 11.8%, that of Comparative Example 1 was 6.8%, and that of Example 2 was 13.0%. Furthermore, the average diffuse reflectance of Example 3 was 14.4%, that of Comparative Example 2 was 22.0%, that of Comparative Example 3 was 31.1%, and that of Comparative Example 4 was 2.9%.

As shown in Table 1, the haze of Example 1 was 98.7%, that of Comparative Example 1 was 98.7%, and that of Example 2 was 98.7%. Furthermore, the haze of Example 3 was 98.0%, that of Comparative Example 2 was 98.8%, that of Comparative Example 3 was 98.8%, and that of Comparative Example 4 was 98.9%.

As shown in Table 1, the clarity of Example 1 was 37.3%, that of Comparative Example 1 was 41.9%, and that of Example 2 was 38.9%. Furthermore, the clarity of Example 3 was 37.6%, that of Comparative Example 2 was 40.3%, that of Comparative Example 3 was 34.2%, and that of Comparative Example 4 was 40.0%.

<Optical Characteristics of Screen in Transparent State>

Haze and parallel light transmittance were measured for the screens of the examples and the comparative examples in a transparent state. Haze was measured using a hazemeter (NDH7000SP manufactured by Nippon Denshoku Industries Co., Ltd.). Parallel light transmittance was measured using a hazemeter (the same as above).

<Evaluations>

Haze and parallel light transmittance calculated for the screens of the examples and the comparative examples were as shown in Table 2.

TABLE 2

|  | Ex. 1 | Comp. Ex. 1 | Ex. 2 | Ex. 3 | Comp. Ex. 2 | Comp. Ex. 3 | Comp. Ex. 4 |
| --- | --- | --- | --- | --- | --- | --- | --- |
| Haze (%) | 11.5 | 9.5 | 11.9 | 12.8 | 13.2 | 14.1 | 5.6 |
| Parallel light transmittance (%) | 42.0 | 56.9 | 43.1 | 55.3 | 44.1 | 30.6 | 81.4 |

As shown in Table 2, the haze of Example 1 was 11.1%, that of Comparative Example 1 was 9.5%, and that of Example 2 was 11.9%. Furthermore, the haze of Example 3 was 12.8%, that of Comparative Example 2 was 13.2%, that of Comparative Example 3 was 14.1%, and that of Comparative Example 4 was 5.6%.

As shown in Table 2, the parallel light transmittance of Example 1 was 42.0%, that of Comparative Example 1 was 56.9%, and that of Example 2 was 43.1%. Furthermore, the parallel light transmittance of Example 3 was 55.3%, that of Comparative Example 2 was 44.1%, that of Comparative Example 3 was 30.6%, and that of Comparative Example 4 was 81.4%.

<Visibility of Opaque-State Screens>

Visibility was evaluated for each screen in an opaque state by ten people. The evaluation method in this case was as shown in FIG. 8.

As shown in FIG. 8, the difference in height between a light source L and an observer OB was defined to be a height H1. The distance between the light source L and the observer OB was defined to be a first distance D1, the distance between the front surface of the screen 10 and the light source L was defined to be a second distance D2, and the distance between a projector P and the screen 10 was defined to be a third distance D3. In this case, the projector P was disposed with respect to the screen 10 so that the surface of the light control sheet 10A of the screen 10 facing away from the transparent reflective layer 15 would be the surface to which light was projected. The height H1 was set to 100 cm, the first distance D1 was set to 50 cm, and the second and third distances D2 and D3 were both set to 100 cm.

An image with a luminance of 800 lm was projected from the projector P to the projection surface of each screen 10, for the ten people's visual inspection evaluation of the screen 10 in terms of sharpness of the image, anti-reflective properties for the projected image preventing other image reflections, and anti-glare properties of the screen. As a result of inspecting the projection surface of each screen 10, if seven or more of the ten people determined the screen to present the image with high sharpness and to have high anti-reflective properties and anti-glare properties, the screen was evaluated to be good in terms of these parameters. If four or more of the ten people determined the screen to present the image with low sharpness and to have only low anti-reflective properties and low anti-glare properties, the screen was evaluated to be poor in terms of these parameters. The evaluations were as shown in Table 3.

TABLE 3

| | Ex. 1 | Comp. Ex. 1 | Ex. 2 | Ex. 3 | Comp. Ex. 2 | Comp. Ex. 3 | Comp. Ex. 4 |
|---|---|---|---|---|---|---|---|
| Sharpness | Good | Poor | Good | Good | Good | Good | Poor |
| Anti-reflective properties | Good | Good | Good | Good | Poor | Poor | Good |
| Anti-glare properties | Good | Good | Good | Good | Poor | Poor | Good |

<Evaluations>

As shown in Table 3, the screens of Examples 1 to 3 and Comparative Examples 2 and 3 had high image sharpness. In contrast, the screens of Comparative Examples 1 and 4 had low image sharpness. Furthermore, the screens of Examples 1 to 3 and Comparative Examples 1 and 4 had good anti-reflective properties. In contrast, the screens of Comparative Examples 2 and 3 had poor anti-reflective properties. Furthermore, the screens of Examples 1 to 3 and Comparative Examples 1 and 4 had good anti-glare properties. In contrast, the screens of Comparative Examples 2 and 3 had poor anti-glare properties.

Thus, the screens of Examples 1 to 3 all had satisfactory image sharpness, anti-reflective properties and anti-glare properties. In contrast, although the screens of Comparative Examples 1 and 4 had satisfactory anti-reflective properties and anti-glare properties, they were not satisfactory in terms of image sharpness. Furthermore, although the screens of Comparative Examples 2 and 3 had satisfactory image sharpness, they were not satisfactory in terms of anti-reflective properties and anti-glare properties.

Thus, as long as the average diffuse reflectance and each diffuse reflectance of the screen were 10% or more and less than 20%, the screen was satisfactory in terms of both image sharpness and anti-glare properties. In contrast, when the average diffuse reflectance and each diffuse reflectance of the screen were less than 10%, the screen did not have satisfactory image sharpness, and when the average diffuse reflectance and each diffuse reflectance of the screen were more than 20%, the screen did not have satisfactory anti-glare properties.

<Visibility of Transparent-State Screens>

Visibility was evaluated for each screen in a transparent state by ten people. The evaluation method in this case was as shown in FIG. 9.

As shown in FIG. 9, the difference in height between a light source L and an observer OB was defined to be a height H2. The distance between the light source L and the observer OB was defined to be a fourth distance D4, the distance between the front surface of the screen 10 and the light source L was defined to be a fifth distance D5, and the distance between the screen 10 and an observation target 51 was defined to be a sixth distance D6. The height H2 was set to 100 cm, the fourth distance D4 was set to 50 cm, the fifth distance D5 was set to 100 cm, and sixth distance D6 was set to 50 cm. In this case, the screen 10 was disposed so that the projection surface of the screen 10 would face the observer OB.

The observation target 51 used had a checkerboard pattern in which white and black squares were alternated in both horizontal and vertical directions (Byko-charts manufactured by BYK-Gardner GmbH). In each square, the length of each side was 31 mm.

The ten people inspected the checkerboard pattern via the screen 10 in a transparent state of each of the examples and the comparative examples. In this case, transparency of the screen 10, anti-reflective properties for the image of the checkerboard pattern preventing other image reflections, and anti-glare properties were evaluated by visual inspection. As a result of inspecting the observation target 51 via the screen 10, if seven or more of the ten people determined the screen to have high transparency and to have high anti-reflective properties and anti-glare properties, the screen was evaluated to be good in terms of these parameters. If four or more of the ten people determined the screen to have low transparency and to have only low anti-reflective properties and anti-glare properties, the screen was evaluated to be poor in terms of these parameters. The evaluations were as shown in Table 4.

TABLE 4

| | Ex. 1 | Comp. Ex. 1 | Ex. 2 | Ex. 3 | Comp. Ex. 2 | Comp. Ex. 3 | Comp. Ex. 4 |
|---|---|---|---|---|---|---|---|
| Transparency | Good | Good | Good | Good | Poor | Poor | Good |
| Anti-reflective properties | Good | Good | Good | Good | Poor | Poor | Good |
| Anti-glare properties | Good | Good | Good | Good | Poor | Poor | Good |

<Evaluations>

As shown in Table 4, the screens of Examples 1 to 3 and Comparative Examples 1 and 4 had high transparency. In contrast, the screens of Comparative Examples 2 and 3 had low transparency. The screens of Examples 1 to 3 and Comparative Examples 1 and 4 had good anti-reflective properties. In contrast, the screens of Comparative Examples 2 and 3 had poor anti-reflective properties. The screens of Examples 1 to 3 and Comparative Examples 1 and 4 had good anti-glare properties. In contrast, the screens of Comparative Examples 2 and 3 had poor anti-glare properties.

Thus, the screens of Examples 1 to 3 and Comparative Examples 1 and 4 all had high transparency and were satisfactory in terms of both anti-reflective properties and anti-glare properties. In contrast, neither of the screens of Comparative Examples 2 and 3 had high transparency, and neither of them had satisfactory anti-reflective properties and anti-glare properties.

Thus, as long as the average diffuse reflectance and each diffuse reflectance were 10% or more and less than 20%, the characteristics required of the screen 10 were satisfied even if the screen 10 was in a transparent state.

If the screen having the second structure is used as a screen, the opaque state of the screen can be evaluated by applying a saturation voltage, which is unlikely to change the alignment of the liquid crystal molecules with the increase of the voltage, to the light control layer as a drive voltage of the liquid crystal molecules.

As described above, according to an embodiment of the screen, the following advantageous effects can be achieved.

(1) While sharpness of an image projected to the screen 10 or 20 is maintained, glare on the screen 10 or 20 due to reflection of external light thereon can be minimized.

(2) If the screen 10 or 20 in an opaque state has haze of 98% or more and clarity of 42% or less, sharpness can be further enhanced in the image projected to the screen 10 or 20.

(3) If the screen 10 or 20 in a transparent state has haze of 12.8% or less and parallel light transmittance of 42% or more, transparency of the screen in this state can be enhanced.

(4) If the solar radiation reflectance is 20% or more and less than 45%, reflection of images other than the image projected to the screen 10 or 20 and glare due to reflection of external light on the screen 10 can be further minimized.

(5) If a UV cut layer 14 is provided, deterioration of the liquid crystal composition contained in the light control layer 11 can be minimized.

(6) If a maximum transmittance is 1% or less for light with a wavelength of less than 380 nm, entry of UV light into the light control layer 11 can be further reduced.

The embodiment described above may be modified and implemented as follows.

<UV Cut Layer>

The UV cut layer 14 may have a maximum transmittance of 1% or more for light having a wavelength of less than 380 nm. In this case as well, if the UV cut layer 14 is capable of absorb or reflect part of light in the wavelength range of UV light, advantageous effect similar to the above item (5) can be achieved.

The UV cut layer 14 may be laminated on the projection surface 10AF or 20AF of the light control sheet 10A or 20A. In this case, the screen 10 or 20 may include an adhesive layer different from the UV cut layer 14 between the light control sheet 10A or 20A and the transparent reflective layer 15. Furthermore, the UV cut layer 14 may be located between the transparent reflective layer 15 and the transparent substrate 16. In this case, while the screen 10 or 20 may include an adhesive layer different from the UV cut layer 14 between the light control sheet 10A or 20A and the transparent reflective layer 15, the UV cut layer 14 may also serve as an adhesive layer that adheres the transparent reflective layer 15 to the transparent substrate 16.

The screen 10 or 20 does not have to necessarily include a UV cut layer 14. In this case as well, as long as the average diffuse reflectance and/or each diffuse reflectance are 10% or more and less than 20% on the screen 10 or 20, advantageous effects similar to the above items (1) and/or (2) can be achieved.

<Visible Light Transmittance>

The transparent reflective layer 15 may have a visible light transmittance of less than 50%. In this case as well, as long as the average diffuse reflectance and/or each diffuse reflectance are 10% or more and less than 20% on the screen 10 or 20 in an opaque state, advantageous effects similar to the above items (1) and/or (2) can be achieved.

<Solar Radiation Reflectance>

The solar reflectance of the transparent reflective layer 15 may be less than 20% or may be more than 45%. In this case as well, as long as the average diffuse reflectance and/or each diffuse reflectance are 10% or more and less than 20%, advantageous effects similar to the above items (1) and/or (2) can be achieved.

<Transparent State>

When the light control sheet 10A or 20A is in a transparent state, the screen 10 or 20 does not have to satisfy either of the haze being 12.8% or less and the parallel light transmittance being 42% or more. In this case as well, as long as the average diffuse reflectance and/or each diffuse reflectance of the screen 10 or 20 are 10% or more and less than 20%, advantageous effects similar to the above items (1) and/or (2) can be achieved.

<Opaque State>

When the light control sheet 10A or 20A is in an opaque state, the screen 10 or 20 does not have to satisfy either of the haze being 98% or more and the clarity being 42% or less. In this case as well, as long as the average diffuse reflectance and/or each diffuse reflectance are 10% or more and less than 20%, advantageous effects similar to the above items (1) and/or (2) can be achieved.

<Usage>

The screen 10 or 20 can also be used as a partition. In this case, the screen 10 or 20 can be used in place of, for example, a curtain, blind, or shoji (Japanese-style paper screen). The state of the screen 10 or 20 in use can be changed as follows. For example, the spaces defined by the screen 10 or 20 in a transparent state can be visually inspected from each other through the screen 10 or 20. Also, the spaces defined by the screen 10 or 20 in an opaque state can each be hidden from the other.

The screen 10 or 20 does not necessarily have to have flat surfaces but may have curved surfaces. If the screen 10 or 20 has curved surfaces as well, they can minimize glare as long as the average diffuse reflectance and each diffuse reflectance are in the range as described in the present embodiment. Therefore, for example, if a curved screen having an arc shape is placed surrounding an observer with the projection surface facing the observer, the observer can be imparted with high immersive feeling by the image projected to the curved screen.

The present application addresses the following. As the use of screens mentioned in the Background expands, they are required to be used in bright places where a large amount of external light enters the screen, in addition to use in dark places where the light projected to the screens easily stands out in contrast to the area surrounding the screens. In this regard, the screen described in JP 2016-109953 A is configured to have a high diffuse reflectance of 20% or more with respect to visible light to increase reflectance of the light projected to the screen. This however raises an issue that the observer may feel dazzled due to glare from the screen induced by reflection of external light.

The present invention has an aspect to provide a screen capable of reducing or preventing glare from the screen due to reflection of external light.

A screen for solving the above issue includes a light control sheet that includes a front surface and a rear surface and has a transparent state and an opaque state, and a transparent reflective layer that includes a transparent reflective layer facing the rear surface. The front surface is a surface to which light from a projection device is applied in the opaque state. The opaque state includes a state in which an average of diffuse reflectances to light in the visible region is 10% or more and less than 20% on the front surface of the screen.

According to the above configuration, if the average of diffuse reflectances is 10% or more, sharpness is maintained in the image projected to the screen, and if it is less than 20%, glare from the screen can be minimized, which is due to reflection of external light by the screen.

A screen for solving the above issue includes a light control sheet that includes a front surface and a rear surface and has a transparent state and an opaque state, and a transparent reflective layer facing the rear surface. The opaque state includes a state in which each diffuse reflectance to light having an arbitrary wavelength of 430 nm or more and 700 nm or less is 10% or more and less than 20% on the front surface of the screen.

According to the above configuration, each diffuse reflectance of the screen is 10% or more and less than 20% for light having any wavelength in the wavelength range including a maximum value of luminous efficiency. Therefore, if each diffuse reflectance is 10% or more, sharpness is maintained in the image projected to the screen, and if it is less than 20%, glare can be minimized on the screen, which is due to reflection of external light on the screen.

Obviously, numerous modifications and variations of the present invention are possible in light of the above teachings. It is therefore to be understood that within the scope of the appended claims, the invention may be practiced otherwise than as specifically described herein.

What is claimed is:

1. A screen, comprising:
  a light control sheet which includes a front surface and a rear surface and has a transparent state and an opaque state; and
  a transparent reflective layer that faces the rear surface,
  wherein the front surface is positioned such that light from a projection device is applied in the opaque state, and
  the opaque state includes a state in which an average diffuse reflectance of visible light applied to the front surface is 10% or more and less than 20%.

2. A screen, comprising:
  a light control sheet which includes a front surface and a rear surface and has a transparent state and an opaque state; and
  a transparent reflective layer that faces the rear surface,
  wherein the opaque state includes a state in which a diffuse reflectance of light with a wavelength of 430 nm-700 nm applied to the front surface is 10% or more and less than 20%.

3. The screen according to claim 1, wherein the opaque state includes a state in which haze is 98% or more and clarity is 42% or less according to JIS K 7136:2000, and the clarity is calculated by Formula (1)

$$100 \times (I_C - I_R)/(I_C + I_R) \qquad \text{Formula (1)}$$

where $I_C$ is an intensity of straight light propagating straight along an optical axis of parallel light that is incident on the screen, and $I_R$ is an intensity of narrow-angle scattered light having an angle of ±2.5° or narrower relative to the optical axis of the parallel light, among light passing through the screen.

4. The screen according to claim 1, wherein the transparent state of the screen includes a state in which haze is 12.8% or less and a parallel light transmittance is 42% or more.

5. The screen according to claim 1, wherein the transparent reflective layer has a solar radiation reflectance of 20% or more and less than 45% according to JIS A 5759:2016.

6. The screen according to claim 1, wherein the transparent reflective layer has a visible light transmittance of 50% or more according to JIS A 5759:2016.

7. The screen according to claim 1, further comprising:
  a UV cut layer,
  wherein the light control sheet includes a light control layer including a liquid crystal composition.

8. The screen according to claim 7, wherein the UV cut layer has a maximum transmittance of 1% or less for light having a wavelength of less than 380 nm.

9. The screen according to claim 2, wherein the opaque state includes a state in which haze is 98% or more and clarity is 42% or less according to JIS K 7136:2000, and the clarity is calculated by Formula (1)

$$100 \times (I_C - I_R)/(I_C + I_R) \qquad \text{Formula (1)}$$

where $I_C$ is an intensity of straight light propagating straight along an optical axis of parallel light that is incident on the screen, and $I_R$ is an intensity of narrow-angle scattered light having an angle of ±2.5° or narrower relative to the optical axis of the parallel light, among light passing through the screen.

10. The screen according to claim 2, wherein the transparent state of the screen includes a state in which haze is 12.8% or less and a parallel light transmittance is 42% or more.

11. The screen according to claim 2, wherein the transparent reflective layer has a solar radiation reflectance of 20% or more and less than 45% according to JIS A 5759:2016.

12. The screen according to claim 2, wherein the transparent reflective layer has a visible light transmittance of 50% or more according to JIS A 5759:2016.

13. The screen according to claim 2, further comprising:
  a UV cut layer,
  wherein the light control sheet includes a light control layer including a liquid crystal composition.

14. The screen according to claim 13, wherein the UV cut layer has a maximum transmittance of 1% or less for light having a wavelength of less than 380 nm.

* * * * *